United States Patent Office 3,288,669
Patented Nov. 29, 1966

3,288,669
PESTICIDAL APPLICATION OF TRIHYDROCAR-
BYLTIN SALTS OF NEOALKANOIC ACIDS AS
FUNGICIDES, BACTERICIDES AND NEMATO-
CIDES
Ingenuin Hechenbleikner, Kenwood, Ohio, assignor to
Carlisle Chemical Works, Inc., Reading, Ohio, a corpo-
ration of Ohio
No Drawing. Filed Mar. 25, 1965, Ser. No. 442,824
14 Claims. (Cl. 167—22)

The present invention relates to novel pesticides.

It is an object of the present invention to kill micro-organisms.

Another object is to prepare novel fungicides.

A further object is to prepare novel bactericides.

An additional object is to prepare nematocides.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by the use of trihydrocarbyltin salts of neoalkanoic acids as fungicides, bactericides and nematocides. Neoalkanoic acids are characterized by having the neo carbon atom, i.e., a carbon atom attached to four different carbon atoms, adjacent to the carboxyl group.

The trihydrocarbyltin salts of the neoalkanoic acids are prepared in conventional fashion by heating a trihydrocarbyltin chloride with the sodium or potassium salt of the neoalkanoic acid and removing the sodium or potassium chloride by-product. The reaction is usually carried out in the presence of an organic solvent, e.g., alcohol, isopropylalcohol, dioxane, ethyl acetate, ethylene glycol benzene, toluene, xylene, diethylene glycol, etc. As the trihydrocarbyltin chlorides starting materials there can be employed trimethyltin chloride, triethyltin chloride, tripropyltin chloride, triisopropyltin chloride, tributyltin chloride, triisobutyltin chloride, tri-sec. butyltin chloride, tri-tert. butyltin chloride, triamyltin chloride, amyl dibutyltin chloride, trihexyltin chloride, tricyclohexyltin chloride, trioctyltin chloride, tri-2-ethylhexyltin chloride, tris-decyltin chloride, tris-dodecyltin chloride, ethyl bis-dodecyltin chloride, tris-octadecyltin chloride, triphenyltin chloride, tri-p-tolyltin chloride, tribenzyltin chloride. As the neolkanoic acid salts starting materials there can be used sodium neopentanoate, potassium neopentanoate, sodium neodecanoate, potassium neodecanoate, sodium neohexanoate, sodium neotridecanoate, sodium neopentadecanoate, sodium neooctanoate, sodium neododecanoate.

As the trihydrocarbyltin neoalkanoates employed to kill microorganisms, e.g. bacteria and fungi, according to the present invention there can be used trimethyltin neodecanoate, triethyltin neopentanoate, triethyltin neodecanoate, tripropyltin neodecanoate, triisopropyltin neopentanoate, tributyltin neopentanoate, tributyltin neohexanoate, tributyltin neoctanoate, tributyltin neodecanoate, tributyltin neododecanoate, tributyltin neoocta-decanoate, tributyltin neotridecanoate, tributyltin neopentadecanoate, triisobutyltin neodecanoate, tri-sec-butyltin neodecanoate, tri-tert. butyltin neodecanoate, amyldibutyltin neopentanoate, triamyltin neooctanoate, trihexyltin neohexanoate, tricyclohexyltin, neodecanoate, trioctyltin neododecanoate, tri-2-ethylhexyltin neotridecanoate, tris-decyltin neodecanoate, tris-dodecyltin neopentanoate, tris-octadecyltin neodecanoate, tris-octadecenyltin neopentanoate, triphenyltin neopentanoate, triphenyltin neodecanoate, triphenyltin neopentadecanoate, tri-p-tolyltin neopentanoate, tri-o-tolyltin neodecanoate, tribenzyltin neodecanoate.

The trihydrocarbyltin neoalkanoates of the present invention are superior fungicides and bactericides to the conventional trialkyltin alkanoates of the same molecular weight such as tributyltin caproate or tributyltin laurate for example.

Unless otherwise indicated all parts and percentages are by weight.

Example 1

Nine moles of tributyltin chloride were dissolved in 7.5 liters of absolute alcohol. 9.05 moles of anhydrous sodium neodecanoate were added with stirring for about one hour and the solution was heated to about 75° C. The sodium chloride which precipitated was filtered off and the alcohol removed by distillation and the tributyltin neodecanoate recovered as the residue.

The compounds of the present invention can be used alone as nematocides, fungicides and bactericides but it has been found desirable to apply them to the pest, e.g., to the soil habitat of nematodes, together with inert solids to form dusts or, more preferably, suspended in a suitable liquid diluent, preferably water. They can be applied at widely varying rates, e.g., 0.1–30 lbs./acre.

There can also be added surface active agents or wetting agents and inert solids in such liquid formulations. Desirably, 0.05–1% by weight of surface active or wetting agent is employed. The active ingredient can be from 0.01 to 95% by weight of the entire composition in such case.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g., ethylene glycol monomethyl ether and diethylene glycol monomethyl ether, alcohols, e.g., ethanol, methanol, isopropanol, amyl alcohol, ethylene glycol, propylene glycol, butyl carbitol acetate and glycerine. Mixtures of water and organic solvents, either as solutions or emulsions, can be employed.

The novel pesticides can also be applied as aerosols, e.g., by dispersing them in air by means of a compressed gas such as dichlorodifluoromethane or trichlorofluoromethane and other Freons, for example.

The pesticides of the present invention can also be applied with nematocidal, fungicidal and bactericidal adjuvants or carriers such as talc, pyrophyllite, synthetic fine silica, attapulgus clay, kieselguhr, chalk, diatomaceous earth, lime, calcium carbonate, bentonite, fuller's earth, cottonseed hulls, wheat flour, soybean flour, pumice, tripoli, wood flour, walnut shell flour, redwood flour and lignin.

It is frequently desirable to incorporate a surface active agent in the pesticidal compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g., p-isooctylphenol condensed with 10 ethylene oxide units, soaps, e.g., sodium stearate and potassium oleate, sodium salt of propylnaphthalene sulfonic acid, (di-2-ethylhexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, octadecyl trimethyl ammonium chloride, polyethylene glycol lauryl ether, polyethylene esters of fatty acids and rosin acids, e.g., Ethofat 7 and 13, sodium N-methyl-N-oleyltaurate, Turkey red oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide-propylene oxide condensation products, e.g., Pluronic 61 (molecular weight 1000), sorbitan sesquioleate, polyethylene glycol ester of tall oil acids, sodium octyl phenoxyethoxyethyl sulfate, tris (polyoxyethylene) sorbitan monostearate (Tween 60), sodium dihexyl sulfosuccinate.

The solid and liquid formulations can be prepared by any of the conventional procedures. Thus, the active ingredient can be mixed with the solid carrier in finely divided form in amounts small enough to preserve the free-flowing property of the final dust composition.

*Example 2*

A cotton fabric containing 0.5% of tributyltin neodecanoate gave the following zones of inhibition against the microorganisms (bacteria and fungi as noted using an agar plate method).

S. aureus _____ 10
E. coli _____ 2
A. niger _____ 7
A. flavus _____ 8

The numbers indicate the zone of inhibition in millimeters.

*Example 3*

Tests for bacteriostatic activity of tributyltin neodecanoate were carried out using a modified American Association of Textile Chemists and Colorists Tentative Test Method 90–1958.

In this modified procedure, the inoculated plates were prepared by pouring plates with about 15 ml. of sterile agar. This sterile agar layer was overlaid with 4 ml. of agar inoculated with *S. aureus*. A strip of vinyl chloride film containing 0.4 part per hundred of tributyltin neodecanoate and a painted glass slide prepared from a styrene-butadiene (SBR) latex paint containing 0.35% tributyltin neodecanoate were placed on the inoculated plates. A pair of plates were prepared with a control vinyl chloride film and with a glass slide painted with a control paint. The plates were incubated at 37° C. for 24 hours and examined for evidence of inhibition of growth at the edge of the test pieces and in the inoculated agar beneath the test pieces which was examined at a magnification of 30 diameters.

Zones of complete inhibition of growth surrounding the test pieces were as follows:

| | Vinyl Film Conc. (parts/hundred) | Zone (mm.) | SBR Latex Paint | |
|---|---|---|---|---|
| | | | Conc. (percent) | Zone (mm.) |
| Tributyltin neodecanoate | 0.4 | 0.9 | 0.35 | 20.9 |
| Control | 0.0 | No inhibition | 0.0 | No inhibition |

*Example 4*

Tests for fungistatic activity of tributyltin neodecanoate were carried out by a modification of Specification MIL–E–5272C, paragraphs 4.8 through 4.8–1.2.

The procedure was modified by preparing the suspension of fungus spores in dextrose broth to provide proper nutrients for the test fungi. The test strips of painted glass slides were suspended in the humidity chambers by means of wire loops. The inoculum was sprayed on both sides of the test pieces to thoroughly wet them. The fungus employed was *Aspergillus niger*.

The results of the fungistatic test described above are given below.

| | SBR Latex Paint | |
|---|---|---|
| | Conc. (percent) | Visual Ruling |
| Tributyltin neodecanoate | 0.1 | 2+ |
| | 0.35 | 1+ |
| Control | 0.0 | 4+ |

In the test 1+ indicates light growth of fungi, 2+ means medium growth of fungi, 3+ means moderately heavy growth of fungi and 4+ means heavy growth of fungi.

Tributyltin neodecanoate is tested as a saprophytic nematocide by applying it to Panagrellus and Rhabditis spp. in water at room temperature at a concentration of 200 p.p.m. and recording the percent kill after a 2 day incubation period.

Tributyltin neodecanoate is tested as a parasitic nematocide by applying it to roots of tomato plants infested with Meloidogyne spp.

In commercial practice the compositions containing the nematocides of the present invention are applied to soil infested with nematodes.

In place of the tributyltin neodecanoate used in the above examples as a fungicide, bactericide and nematocide there can be used any of the other trihydrocarbyltin neoalkanoates, e.g., tributyltin neopentanoate, tributyltin neotridecanoate, tripropyltin neooctanoate, tricyclohexyltin neodecanoate and triphenyltin neodecanoate.

What is claimed is:
1. A process of killing a pest from the group consisting of microorganisms and nematodes comprising applying to the pest a pesticidally effective amount of a trihydrocarbyltin neoalkanoate.
2. A process of killing fungi comprising applying to the fungi a fungicidially effective amount of a trihydrocarbyltin neoalkanoate.
3. A process according to claim 2 wherein the neoalkanoate is a trialkyltin neoalkanoate.
4. A process according to claim 3 wherein the neoalkanoate is a tributyltin neoalkanoate.
5. A process according to claim 4 wherein the neoalkanoate is tributyltin neodecanoate.
6. A process according to claim 2 wherein the neoalkanoate is a tricarbocyclic aryltin neoalkanoate.

7. A process of killing bacteria comprising applying to the bacteria a bactericidally effective amount of a trihydrocarbyltin neoalkanoate.

8. A process according to claim 7 wherein the neoalkanoate is a trialkyltin neoalkanoate.

9. A process according to claim 8 wherein the neoalkanoate is a tributyltin neoalkanoate.

10. A process according to claim 9 wherein the neoalkanoate is tributyltin neodecanoate.

11. A process according to claim 7 wherein the neoalkanoate is a tricarbocyclic aryltin neoalkanoate.

12. A process of killing nematodes comprising applying to the nematodes a nematocidally effective amount of a trihydrocarbyltin neoalkanoate.

13. A process according to claim 1 wherein the neoalkanoate is a trialkyltin neoalkanoate wherein the alkyl groups have 3 to 5 carbon atoms.

14. A process according to claim 13 wherein the neoalkanoate is the neoalkanoate of a neoalkanoic acid having 5 to 15 carbon atoms.

No references cited.

LEWIS GOTTS, *Primary Examiner.*

SHEP K. ROSE, *Assistant Examiner.*